United States Patent [19]

Hansford

[11] 4,297,810

[45] Nov. 3, 1981

[54] SPRAYABLE HYDROMULCH

[76] Inventor: William B. Hansford, 109 May St., Somerset, Ky. 42501

[21] Appl. No.: 126,412

[22] Filed: Mar. 3, 1980

[51] Int. Cl.³ .............................................. A01G 7/00
[52] U.S. Cl. ............................................... 47/9; 111/1
[58] Field of Search ................................. 111/1; 47/9

[56] References Cited

U.S. PATENT DOCUMENTS

| 1,882,377 | 10/1932 | Whittelsey | 47/9 |
| 2,699,629 | 1/1955 | Wandel | 47/9 |
| 2,842,897 | 7/1958 | Finn | 47/9 |
| 2,952,493 | 9/1960 | Finn | 47/9 X |
| 3,017,720 | 1/1962 | Busch | 47/9 X |
| 3,091,436 | 5/1963 | Finn | 47/9 X |
| 3,125,294 | 3/1964 | Lill | 47/9 X |
| 3,241,173 | 3/1966 | Finn | 47/9 X |
| 3,303,609 | 2/1967 | MacHenry | 47/9 |
| 3,696,559 | 10/1972 | Hatton | 47/9 |
| 4,067,140 | 1/1978 | Thomas | 47/9 |
| 4,219,966 | 9/1980 | McCalister | 47/9 |
| 4,232,480 | 11/1980 | Videen | 47/9 |

*Primary Examiner*—Robert E. Bagwill
*Attorney, Agent, or Firm*—Cook, Wetzel & Egan, Ltd.

[57] ABSTRACT

The present invention is directed to a sprayable hydromulch which is effective in reclaiming land, and which is particularly useful in planting seed to establish ground cover on reclaimed strip mining areas.

15 Claims, No Drawings

SPRAYABLE HYDROMULCH

BACKGROUND OF THE INVENTION

Soil erosion is a phenomenon which occurs in a wide variety of situations. Erosion is accelerated by the action of wind and rain and is particularly troublesome in conditions of poor soil coherence. Land which has no ground cover, and particularly sloped land, will not retain the seeds of plants that might germinate to provide a root system to hold the soil in place. In such situations, rain storms fashion streams of water which carry away the seeds as well as the surface soil.

In the reclaiming of land from strip mine areas, inevitably large areas of soil entirely devoid of ground cover are created. In order to make such land attractive, it is frequently sloped, which aggravates the erosion problem. Further, the formation of highways and roads requires the making of cuts, embankments, culverts and the like which involve steeply sloped bare soil which is exposed to weather and prone to erosion if not stopped.

In order to apply seed and fertilizer rapidly, it is customary to spray aqueous slurries of seed, fertilizer and other nutrients on soil to be reclaimed. It is also common to distribute a layer of straw, by hand, over the surfaces of soil which have been thus planted. However, straw is susceptible to loss by wind and rain, and has proven to be ineffective on sloped surfaces. The prior art has proposed the use of a wide variety of materials to hold the straw in place, such as asphalt emulsions and the like. Various binding systems are proposed in the prior art, including U.S. Pat. No. 3,292,307, U.S. Pat. No. 3,482,353, U.S. Pat. No. 3,696,559, and Re. Pat. No. 28,950.

Further, the prior art has described mulch systems produced from cellulosic fibers, such as U.S. Pat. Nos. 3,017,720 and 3,165,862. These patents describe a mulch which comprises straw or other similar material which is adhered together using asphalt as an adhesive. While many of the compositions described in the prior art have been successful in producing mulch compositions satisfactory to accomplish a re-seeding of soil, such compositions, as a practical matter, have not been adapted to spraying.

Portable equipment which is adapted to spray aqueous slurries of seed and fertilizer and methods of spraying are described in the prior art, including U.S. Pat. Nos. 2,789,399, 2,842,897, 2,878,617, 3,091,436, and 3,292,307. The equipment described by the prior art is adapted to spray aqueous suspensions of finely divided cellulostic matter, chiefly chopped or cut-up cardboard and paper stock mixed with seeds and fertilizer to produce a mulch. The advantage of such equipment is its ability to spray the mulch on relatively inaccessable places which are not adapted to hand placement of the mulch.

The prior art, however, has failed to provide a hydromulch wherein the mulch, the seed, fertilizer, and lime necessary to support the growth of vegetation can be applied in a single operation. The prior art has relied, in general, on the hand application of hay or straw to provide the necessary mulch.

SUMMARY OF THE PRESENT INVENTION

The present invention provides a sprayable mulch, the principal component of which is hay which is cut or milled to give a mixture of fibers of diverse sizes, and preferably fibers having a distribution of various sizes between about $\frac{1}{4}$ inch to 6 inches in length, with an average between $2\frac{1}{2}$ and 4 inches in length.

The mulch of the present invention has as its principal component cut and cured hay which is preferably hammer milled to give a certain average size and which must contain a distribution of particle sizes within the broader size range. The second required component of the hydromulch composition is shredded and/or chopped paper, preferably magazine stock, to provide fibers or particles within certain size ranges. Preferably the composition also includes a binder agent or adhesive such as a naturally occuring gum which assists in holding the mulch composition in place after application. It is also preferred to include a coloring agent in the hydromulch.

In the preferred embodiment, the pumpable hydromulch of the present invention comprises, on a dry weight basis, hay 80–80%, paper magazine stock 10–17%, binding agent up to 1.5%, coloring agent up to about 1.5%. In the preferred embodiment the hay is hammer milled or otherwise cut from its original size to give an average fiber length of about $2\frac{1}{2}$ to 4 inches, but which includes pieces ranging from $\frac{1}{2}$ inch to 6 inches. The paper magazine stock is preferably shredded into $\frac{1}{4}$ inch strips and then chopped into lengths between $\frac{1}{4}$ inch and 1 inch. Thus the paper particles are generally smaller in size than the hay fibers.

In a most preferred embodiment, the pumpable mulch comprises, on a dry basis, the following approximate formula:

Hay 85% by weight
Paper Magazine Stock 12% by weight
Binding Agent 1.5% by weight
Coloring Agent 1.5% by weight Those skilled in the art will understand that the foregoing percentages are approximate and that wide variations may be made therein without loosing the advantages of the present invention.

Although applicant does not wish to be bound by the theory, it is postulated that the foregoing composition produces superior results because the paper magazine stock cooperates with the hay, when the composition of the present invention is used. It can be demonstrated that when the mulch of the present invention is applied to the soil, the larger particles of hay form a web of fibers suspended above the soil and that the fibers are held in the web formation by the binding agents and the naturally occurring binders. Because of the diverse particle sizes of the materials used in the composition of the present invention, it is postulated that upon application of the mulch to the soil, the fine particles, i.e., paper stock and some of the smallest hay particles, fall to the soil to form a monolithic mat of paper fibers which covers the soil. The resulting paper mat exists beneath the fibrous network of the hay which is suspended above the ground level because of the fibrous and springy nature of the hay fibers.

During the first rains after the application, further paper particles fall or are washed out of the hay to join the paper mat which covers soil underneath the web of hay. The paper mat which covers the soil functions to secure the seeds against the soil and to hold the moisture in the soil until the paper rots 3–5 weeks after application. The seeds generally germinate about 4 weeks after application, when the paper rotting process takes place. During the first 3–5 weeks after application, the hay serves to protect the underlying paper mat from erosion caused by rain, i.e., rain drops will hit the hay web first, and thus shatter before dropping onto the paper mat below. After the rain drops hit the hay, the shattered drops or fine spray fall down onto the paper mat, where the moisture is held, thus promoting the germination of the seeds. Thus the web of hay prevents disruption of the paper mat and the resulting erosion.

Moreover, through the first several weeks following the application, the web of hay which is positioned above the soil acts as a thermal insulator, thus shielding the seeds and the soil on which they are positioned from the extreme heat of the day and extreme cold of the night. Thus the hay promotes an even temperature and moist conditions in the seeds, which encourages a high proportion of germination.

After several months, the hay which forms the web begins to decompose. By this time, the paper web has decomposed and the seeds have germinated. Thus, as the hay begins to decompose the nutrients in the hay become available to the seedlings.

In accordance with the present invention, the hay employed may be grass of any type which is cut and cured for fodder. It includes grass and grass seed of various types and varieties, clover, alfalfa, as well as other forage plants, and the like which is cut and dried and chiefly grown for the purpose of using the fodder for animals. The hay is the preferred fibrous material used in the present invention because it contains a substantial quantity of seed, and thus is self-seeding, and includes many materials adapted to serve as plant nutrients. It is known that hay has a substantial content of nitrogen and growth promoting minerals.

In accordance with the present invention, the mulch comprises a major portion of hay and preferably from 80–90% by weight of hay, because the hay provides a sufficient seed and nutrient content.

A minor amount of paper stock must be included in the mulch composition. In the preferred embodiment, shown above, about 12% by weight of the composition comprises paper magazine stock. The use of at least 10% by weight of magazine stock, chopped or cut to fairly small particle sizes, is adequate to form a mat on the soil as explained above. The magazine stock is preferred over other forms of paper or cellulose fibers because magazine stock is usually clay coated and the clay appears to function as a binder or adhesive for the paper mat. Sufficient paper magazine stock must be included to form a mat over the soil, but the use of more than 15–17% does not improve the mat and is not preferred because the excess paper provides little if any plant nutrients or other benefits.

Alternatively, a small amount of newspaper stock or cardboard or other cellulose-based fibers may be used in place of the magazine stock, provided they are finely chopped, be employed, but it is preferred that at least half of the mat forming material be comprised of paper magazine stock.

As is shown in the preferred embodiment above, it is preferred to use about 1.5% by weight of binding agent. It has been found that Karaya gum produces very satisfactory results and it is preferred over all other binding agents. Broadly speaking, however, the binding agent may be any of the naturally occuring gums, asphalt, and other materials which will tend to adhere the fibers of the hay to avoid rain enduced erosion. Those skilled in the art will know that wet hay, in of itself, is sticky and, when placed on a solid surface will tend to adhere thereto. Thus, it is possible to use the composition of the present invention with little or no binder if the composition is to be applied to relatively level surfaces. However, because in most cases, i.e., strip mine land reclaimation, many sloped surfaces are encountered, it is generally preferred to use a binder. While it has been found that good results may be obtained using up to about 1.5% by weight of a gum-type binder, based on the weight of the other dry materials, greater proportions of binder materials may be used, but because of economic considerations, more than about 1.5% by weight of binder is considered to be economically impractical.

As is shown in the preferred embodiment above, it is preferred that the mulch composition of the present invention include a dye or coloring agent, such as Calcozine Green. Such coloring agents may be used at a level of about 1.5% by weight based on the overall solids composition. While green dye is preferred for aesthetic reasons, other colors may be used. The coloring agent is used chiefly for aesthetic purposes, in that it serves no mechanical or organic purpose in the composition. The coloring material functions to show the operator of the spraying equipment what areas have been covered with hydromulch and thereby avoid gaps and overlapping in the application of the hydromulch.

The sprayable hydromulch of the present invention may be applied using conventional mulch spraying equipment, such as the equipment manufactured by Finn Equipment Company of Cincinnati Ohio. Preferably the Finn equipment is used with a modified wear plate, which has a larger orifice and a greater taper than the conventional wear plate. Specifically it has been found that the $11\frac{1}{2}$ inch diameter, $1\frac{1}{2}$ inch thick wear plate which has a $7\frac{7}{8}$ inch opening which tapers down to $3\frac{3}{4}$ inches provides useful results.

In order to produce the pumpable hydromulch of the present invention, it is essential to process all of the components to meet the size criteria, which, as a practical matter requires that the mulch be prepared under given conditions. It has been found that passing the raw materials from the hydromulch through two tandem hammer mill operations will produce a mulch having a satisfactory range of particle sizes. More particular, it has been found that the hay and the paper magazine stock, in appropriate proportions can be mixed together and fed through a hammer mill to produce materials on the average of about the 2–6 inch size range. At this point, the required amount of Kayara gum is added and the resulting mixture is passed through a second hammer mill wherein the size of the fiber is reduced to an average of about approximately $2\frac{1}{2}$ to 4 inches. At this point the mulch contains fibers which are as long as 6 inches, and as small as $\frac{1}{4}$ inch, with the average being about $2\frac{1}{2}$ to 4 inches. The milled mulch may be air transported, i.e., using pneumatic conveyors. Pneumatic conveyors are adaptable to spraying the resulting mulch with a dye at the level desired.

The mulch may be packaged in bags for use and shipment. Although plastic bags are preferred, the present invention is not limited to any particular form or style of shipping container.

The hydromulch of the present invention is used by placing it in tanks which are subsequently filled with water to provide a pumpable suspension. Most conventional spraying equipment is provided with a stirring capability which is adequate to form a sprayable suspension with the mulch of the present invention. Conventional emulsifiers may be added during the manufacture of the mulch or when the aqueous suspension is made up, but emulsifiers are not considered to be essential.

The hydromulch may be used with the supplemental seed and fertilizer. Preferably, the seed is mixed with the water first, followed by the fertilizer and the mulch in either order. Because the hay which is used in the hydromulch of the present invention is preferably reduced in size by passing the hay through a hammer mill, it is inevitable that some of the seed which is naturally found in the hay will be destroyed. In this case it may be desirable to add supplemental seed and/or fertilizer to the hydromulch. For example, it has been found that approximately 100 pounds of seed per acre may be used to supplement the naturally occuring seed in the mulch of the present invention. Generally the seed and/or fertilizer is added at the time the mulch is mixed with the water in the hydroseeder in order to provide the greatest flexibility of seed and fertilizer combinations to be used with the mulch.

While those skilled in the art will be aware that various quantities of supplemental seed and supplemental fertilizer may be used with the mulch of the present invention, it is generally contemplated that an additional 100 pounds per acre of seed and about 60 units of nitrogen, 60 units of phosphate, and 60 units of potash per acre employed with mulch quantities as indicated above, will produce satisfactory results.

The mulch of the present invention preferably applied to the land to be reclaimed on a variable basis depending upon the slope of the land. Generally and relatively flat land, from 500 to 600 pounds of mulch per acre is desired. Because there is little erosion problem with flat land, it has been found that this much mulch provides temperature or thermal insulation and moisture control adequate to have adequate germination and growth of the seed. Generally it has been found that 100 pounds of mulch per acre should be added to each two degrees of slope and up to 1500 or 1600 pounds of mulch per acre can be used.

The sprayable hydromulch of the present invention is used by mixing it with water to form a suspension. Commercially available hydromulch spraying equipment have tanks sufficient in size to hold 2500 gallons of water. In operation, the tanks are filled with water and sufficient hydromulch of the present invention is added to form a slurry or suspension which may be sprayed on the land and soil to be reclaimed. For instance, it has been found that good results are obtained with 500 pounds of mulch mixed with 2500 gallons of water when sprayed per acre of relatively flat land. Steeper slopes, require a greater quantity of mulch per acre to avoid erosion. It has been found that 1500 pounds of mulch mixed with 2500 gallons of water per acre provide good reclaimation of sloped land.

The following examples serve to illustrate the use of the sprayable hydromulch compositions within the scope of the present invention, but it is understood that these examples are set forth merely for illustrative purposes and that many other compositions are within the scope of the present invention.

EXAMPLE I

For one acre of steep sloping land, the following formula would be used:
100 lbs. of seed
350 lbs. of fertilizer
1,500 lbs. of mulch
2,500 gallons of water
Lime as needed, according to soil conditions. Such compositions may be sprayed from 150 to 200 feet using conventional equipment.

EXAMPLE II

For one acre of rolling land, you would require the following:
100 lbs. of seed
350 lbs. of fertilizer
750 lbs. of mulch
2,500 gallons of water.

The forms of invention shown and described herein are to be considered only as illustrative. It will be apparent to those skilled in the art that numerous modifications may be made therein without departing from the spirit of the invention or the scope of the appended claims.

I claim:

1. A pumpable hydromulch composition suitable for use in soil reclaimation, which comprises, on a dry weight basis:
   Hay 80-90%
   Paper Stock 10-17%
   Binder up to 1.5%
   Coloring Agent up to 1.5%
wherein said hay fibers are no greater than about 6 inches in length, and wherein said paper stock is in the form of particles of an average size no greater than about 1 inch in both dimensions.

2. A composition as described in claim 1 wherein said paper stock is magazine paper stock.

3. A composition as described in claim 1, which comprises, on a dry weight basis:
   Hay about 85%
   Paper Stock about 12%
   Binding Agent about 1.5%
   Coloring Agent about 1.5%.

4. A composition as described in claim 3, wherein said paper stock is magazine paper stock.

5. A pumpable hydromulch composition suitable for use in soil reclaimation, which comprises, on a dry weight basis:
   Hay 80-90%
   Paper Stock 10-17%
   Binder up to 1.5%
   Coloring Agent up to 1.5%
wherein said hay fibers average from $2\frac{1}{2}$ to 4 inches in length but which includes fibers which range between about $\frac{1}{4}$ inch and about 6 inches in length, and wherein said paper stock is in the form of particles of an average size no greater than about 1 inch in both dimensions.

6. A composition as described in claim 5, wherein said paper stock is magazine paper stock.

7. A composition as described in claim 5, wherein said binder is Karaya gum.

8. A composition as described in claim 7, wherein said Kayara gum comprises about 1.5% of said composition.

9. A composition as described in claim 5, wherein said coloring agent is Calcozine Green.

10. A composition as described in claim 9, wherein said Calcozine Green comprises about 1.5% of said composition.

11. A composition as described in claim 5, which comprises, on a dry weight basis:
    Hay about 85%
    Paper Stock about 12%
    Binding Agent about 1.5%
    Coloring Agent about 1.5%.

12. A composition as described in claim 11, wherein said paper stock is magazine paper stock.

13. A sprayable hydromulch composition used in treating soils to reduce erosion thereof and to aid in the germination of plant seed comprising, on a dry material basis:

Hay 85% by weight
Paper Magazine Stock 12% by weight
Karaya Gum Binding Agent 1.5% by weight
Calcozine Green Coloring Agent 1.5% by weight said hay having been reduced in size to pieces between 0.5 inches and 6 inches, having average size of between about 2½ and 4 inches, said paper magazine stock having been reduced in size to pieces no more than about 1 inch in both dimensions, and from about 1.5 to 5 gallons of water per pound of said dry materials.

14. A composition as described in claim 13, wherein supplemental seed is added.

15. A composition as described in claim 13, wherein supplemental seed and fertilizer is added.

* * * * *